Sept. 16, 1958      H. L. SEIDEN      2,851,936
PHOTOGRAPHIC LIGHT BAR
Filed Feb. 9, 1953      6 Sheets-Sheet 1
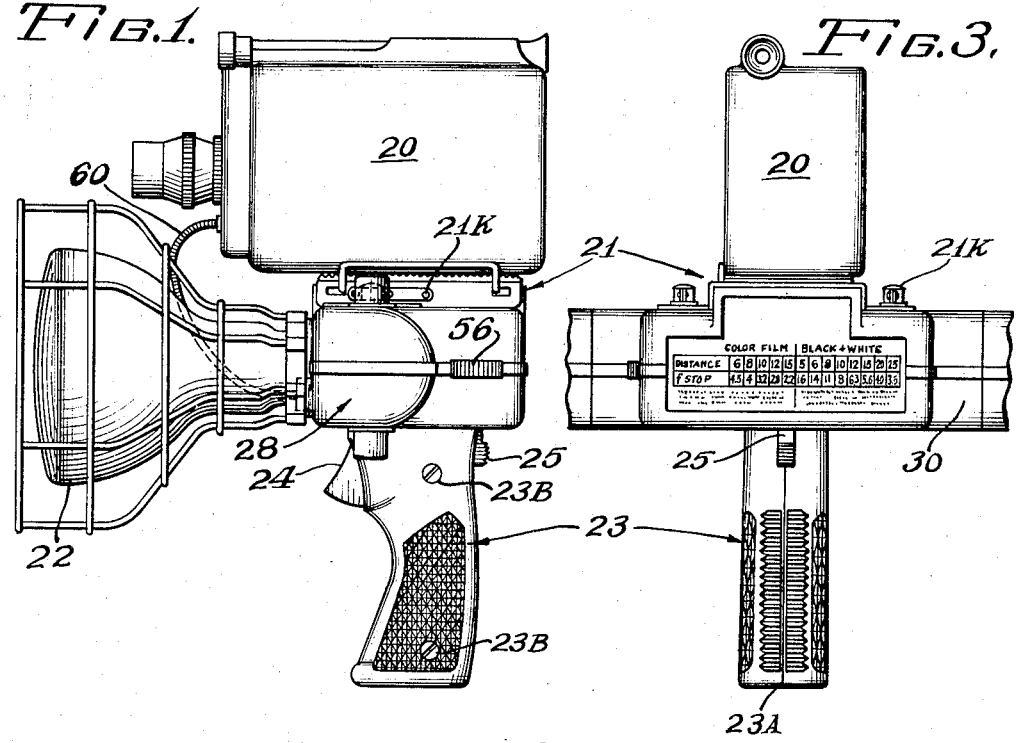
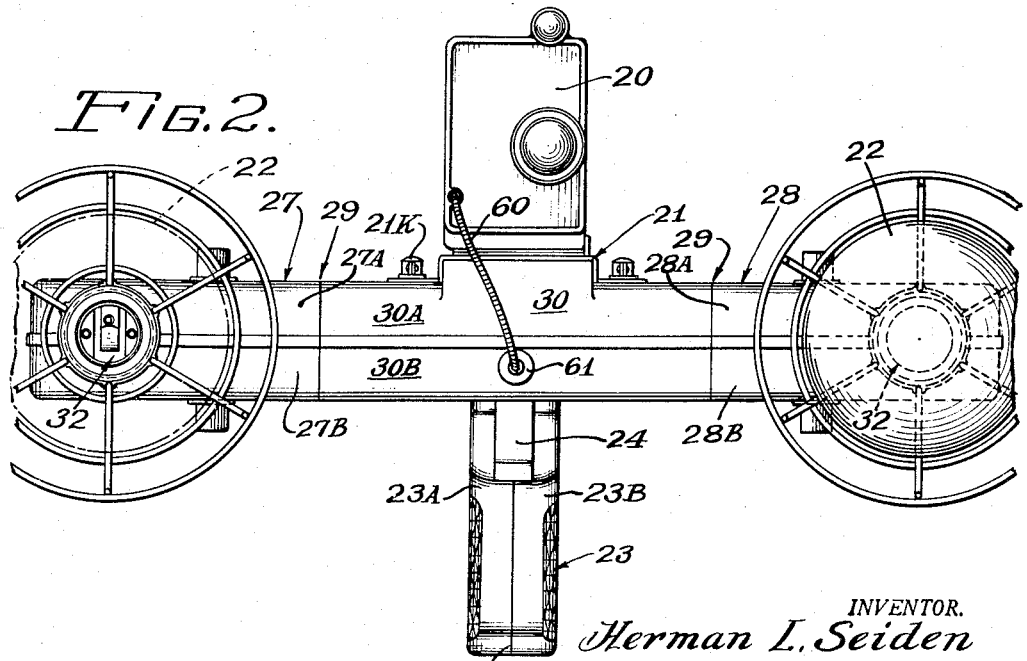
INVENTOR.
Herman L. Seiden

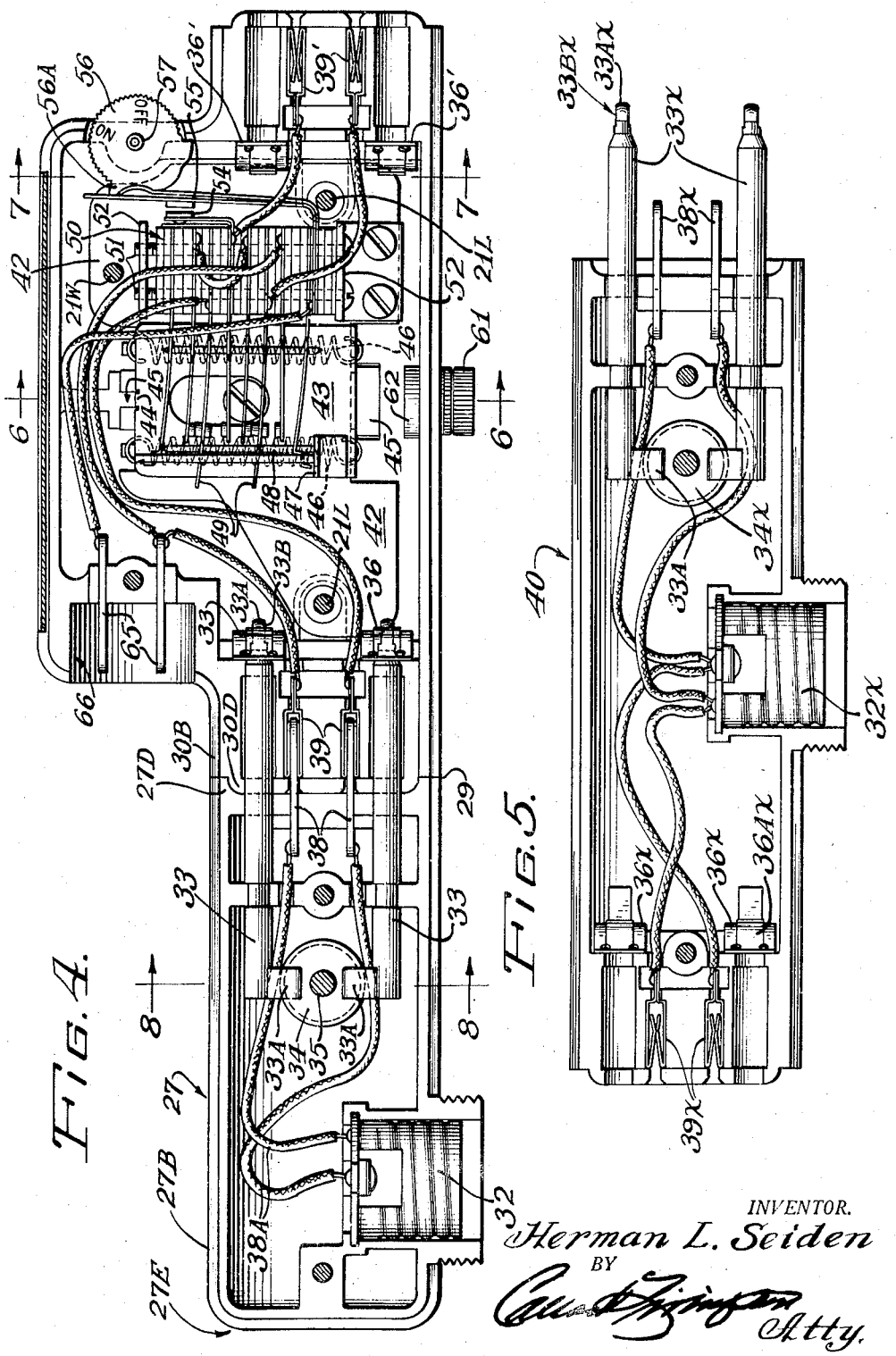

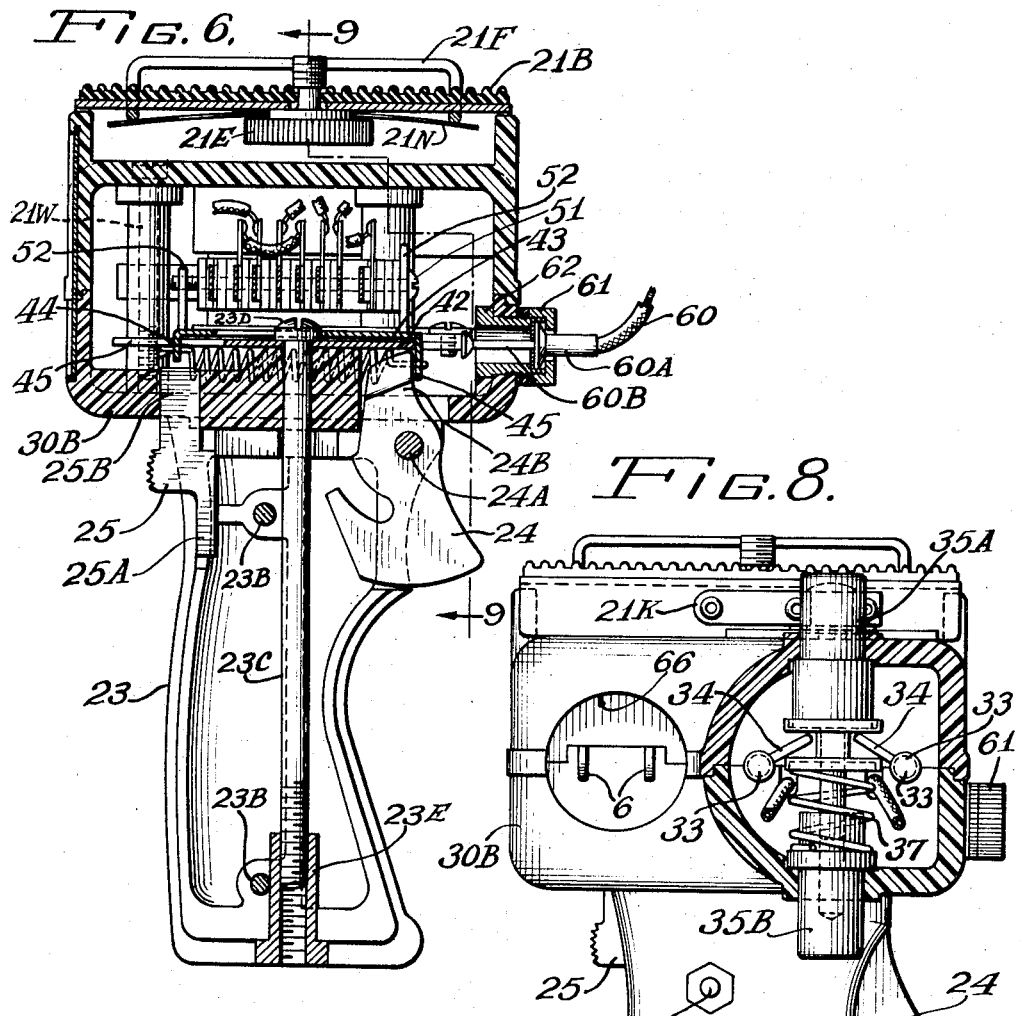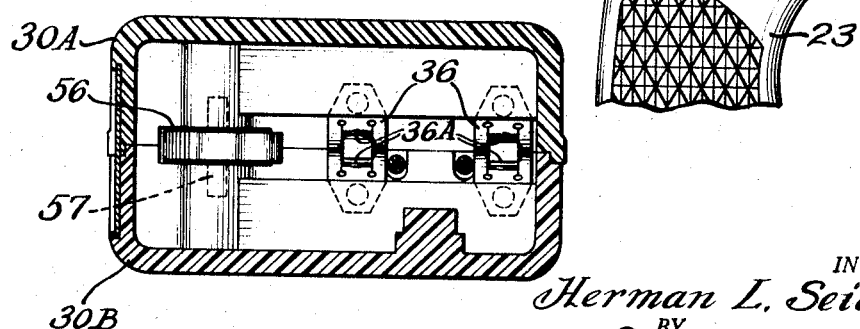

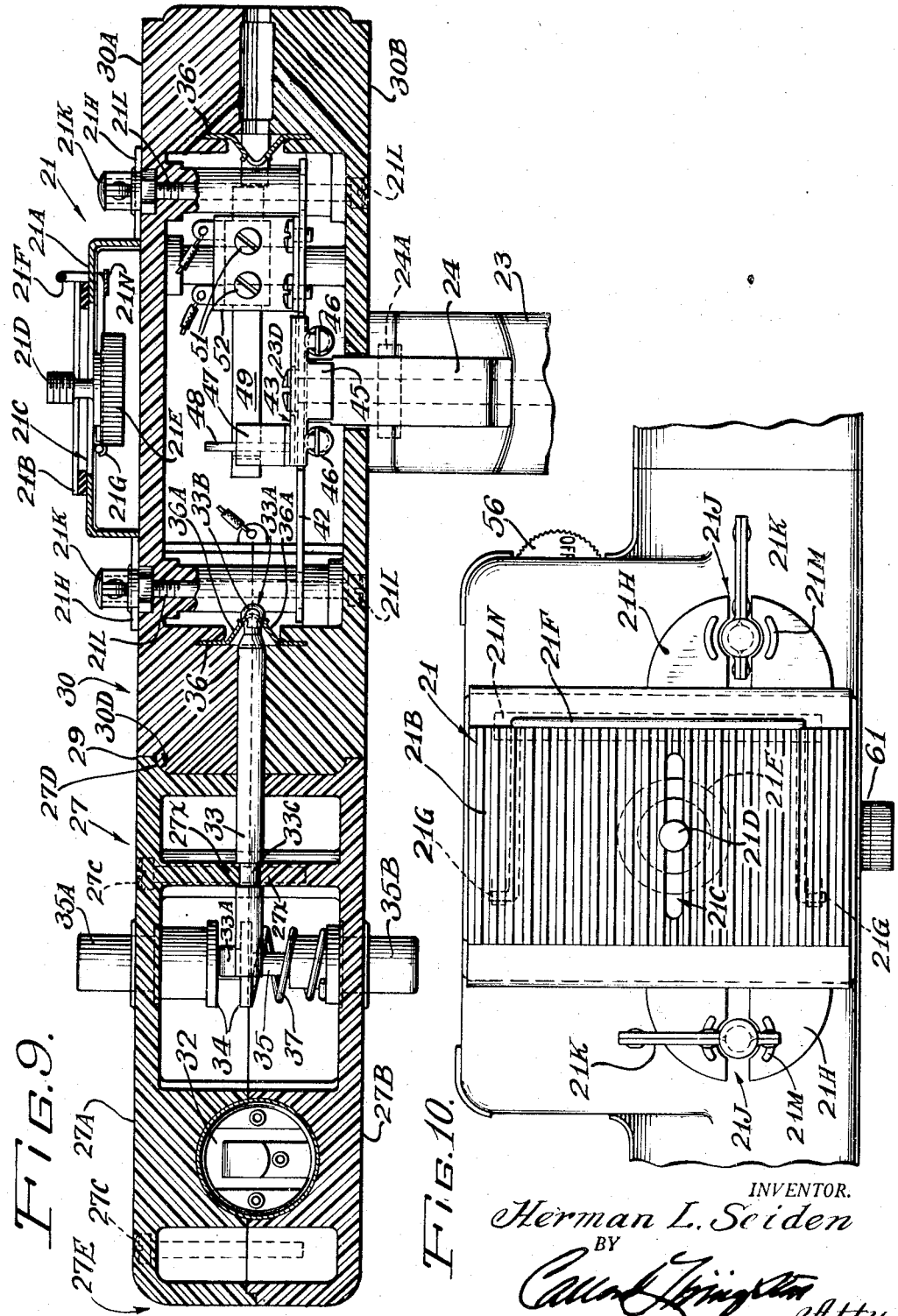

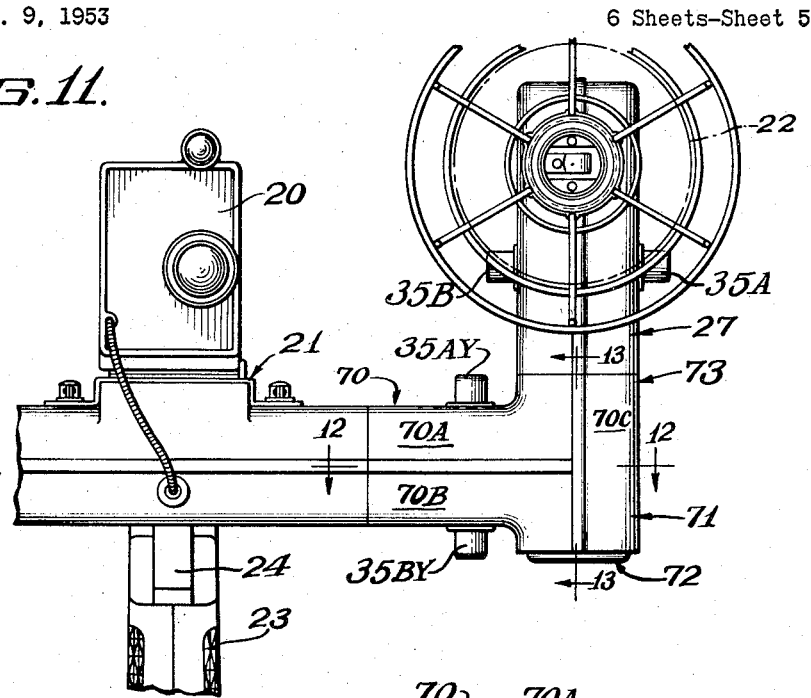
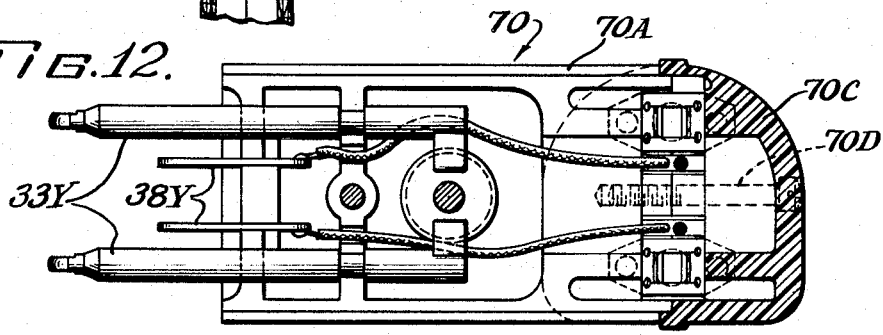
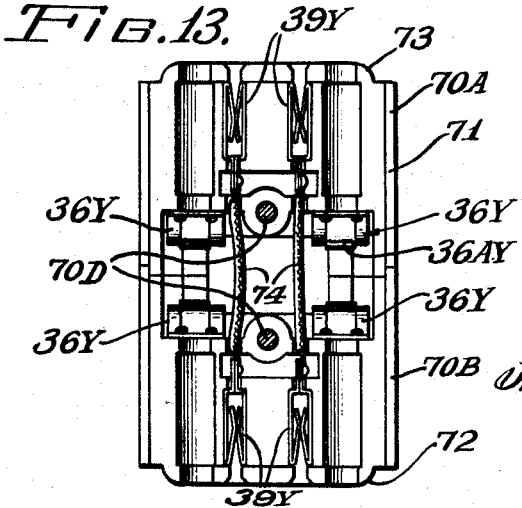

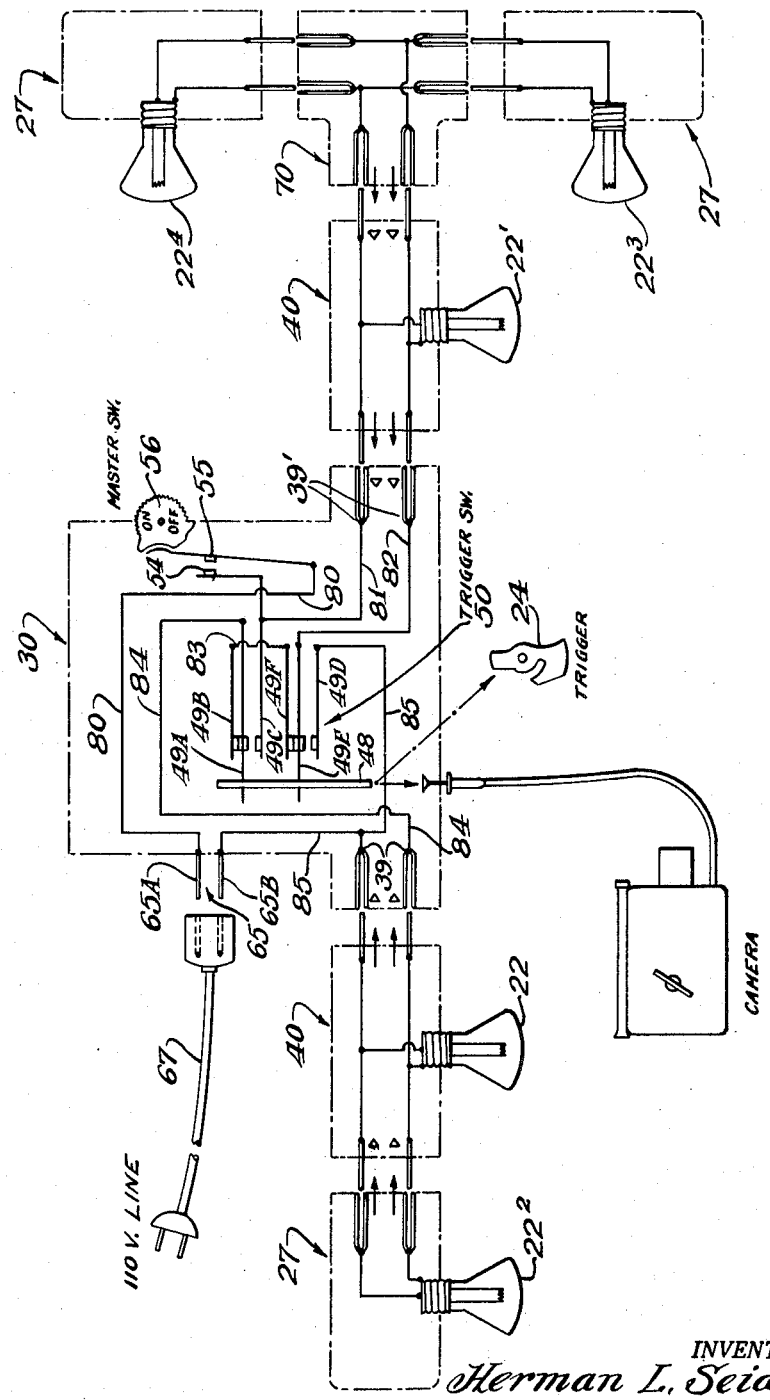

«2,851,936
Patented Sept. 16, 1958»

2,851,936

PHOTOGRAPHIC LIGHT BAR

Herman L. Seiden, Chicago, Ill.

Application February 9, 1953, Serial No. 335,789

9 Claims. (Cl. 95—11.5)

This invention pertains to photographic lighting equipment and has as its principal object the provision of a combination light bar and camera mount which is characterized by a sectionalized plug-in construction permitting the addition or subtraction of a number of plug-in lamp units either in a linear or an angular arrangement to procure different photographic lighting effects.

Another feature is the provision of a camera mount adapted to hold a motion-picture or other camera in predetermined cooperative relation to a bank of lamps.

Another feature is the provision, as a part of the camera mount, of a hand grip which includes certain trigger means for controlling the light circuits and actuating the camera simultaneously.

Another feature is the provision of circuit means for maintaining the filaments of the lamps at reduced brilliance during idle periods preparatory to switching to full brilliance when the camera is operated, in order to overcome the time lag otherwise encountered following energization of a cold lamp filament.

Still other features and aspects of novelty and utility relate to details of the construction of the lamp units and camera mount, as well as the electrical connecting and switching means, the camera control means, the mechanical and electrical plug-in connections for the several lamp units, a manual release means for freeing the plug-in units, a locking and release means for the camera, and certain structural novelties relating to the form and mode of assembly of the various light bar components, all of which will appear more fully as the following description proceeds in view of the annexed drawings, in which:

Fig. 1 is a side elevation of the novel light bar and camera mount;

Fig. 2 is a front elevational view of the same showing two lamp units flanking the central camera mount;

Fig. 3 is a fragmentary rear elevation of the bar showing the camera mounting unit;

Fig. 4 is an enlarged top plan view of the interior of the camera mounting unit and one terminal-type plug-in light unit, as the same are viewed upon removal of the top half-shell of the casing structure thereof;

Fig. 5 is a top plan view of the interior of an intermediate lamp unit with the upper half of the casing shell thereof removed, as in the view of Fig. 4;

Fig. 6 is a vertical sectional view, with parts in elevation, taken through the camera mount, the lower portion showing the interior of the hand-grip in elevation as a result of removal of one half section of the shell structure thereof; the entire view being taken along lines 6—6 of Fig. 4;

Fig. 7 is a vertical cross-sectional detail taken along lines 7—7 of Fig. 4, interior parts being shown in elevation;

Fig. 8 is a fragmentary side elevation of the camera mounting unit with parts of the button plug-in release shown in section, as viewed in the direction of lines 8—8 of Fig. 4;

Fig. 9 is a vertical sectional view of the device of Fig. 4, with part of the hand-grip shown in elevation, the section looking in the direction of lines 9—9 of Fig. 6;

Fig. 10 is a fragmentary top plan view of the camera mount looking down upon the camera bed and locking means;

Fig. 11 is a fragmentary front elevational view of the light bar of Fig. 2 modified to include one angular or side-lighting lamp unit in place of a horizontal lamp unit;

Fig. 12 is a top plan view to enlarged scale, and with parts shown in section, looking down into the bottom half of the casing shell of the angular lamp unit as seen in the direction of lines 12—12 of Fig. 11;

Fig. 13 is an elevational view looking into the main casing or shell portion of the angular lamp unit or adapter in the direction of lines 13—13 of Fig. 11 with the outer or end-cap shell section removed;

Fig. 14 is a schematic circuit diagram.

In the side view of the improved light bar depicted in Fig. 1, a motion-picture camera 20 is shown in position on the camera head or mount 21, with one of a set of high-wattage lamps 22 apparent below the camera.

For portable use, the device is carried by grasping a pistol grip 23, at the front of which is a control trigger 24 adapted to be locked in operative position by means of a locking button 25 at the rear of the grip and positioned for easy operation by the thumb.

The sectionalized character of the device appears in the front view of Fig. 2 wherein two terminal units or end sections 27 and 28 are plugged together, meeting as at 29 with the central control unit 30, of which the camera mount 21 and pistol grip 23 are a part.

Plug-in units 27 and 28 are shown for only two lamps 22 in Fig. 2, but it will appear more fully hereinafter that additional intermediate units are provided so that three or four lamps may be used if desired, all in a straight line or with offsetting for side-lighting and other effects, as in the modification shown in Fig. 11, for example.

The construction of the unit components 27, 28, 30, and others to be described, is such that the mechanisms thereof are housed in separable plastic shells 27A, 27B, 28A, 28B, 30A, 30B, etc. (Fig. 2); and the grip 23 also comprises two complementary shell sections, as will more fully appear.

Fig. 4 shows the lower sections 27B and 30B of the left "terminal" unit and the central control unit of Fig. 2, as the internal mechanisms appear therein with their respective upper shell portions removed.

The terminal type of lamp unit 27 includes a lamp socket 32 seated in the recessed portion of the molded plastic shell, so as to open into the front side of the unit, as in Fig. 2.

From the right-hand end of the unit 27 projects a pair of metal holding and locking pins or prongs 33 having at their inner ends operating cams 33A adapted to be engaged by a grooved collar 34 fast on a pin 35 which is seated to reciprocate vertically crosswise of the casing or shell assembly (see also Fig. 9) for the purpose of turning said prongs to release the same from the spring holding clips 36 seated in the central unit 30.

As viewed in Figs. 8 and 9, a spring 37 urges the cam collar 34, and hence the reciprocable pin 35, to a normal position in which the bulbous ends of holding prongs 33 will automatically lock into the spring clips 36.

Projecting through openings in the mating shell sections 27A, 27B are plastic push-button elements 35A and 35B fixed in the rod or pin 35 for manipulation to turn the holding prongs 33 and thereby release (or forcibly restore) the bulbous locking ends 33A thereof from locking engagement with the clips 36, by reason of the fact that said bulbous prong ends have flattened sides 33B (Figs. 4 and 9) which can be turned, by the aforesaid releasing action, so as to pass freely between the spring fingers 36A which are punched outwardly of the clip bodies. Additional views of the clips 36 are seen in Figs. 7 and 13.

Since the construction and operation of the aforesaid holding and locking prongs is the same in both terminal and intermediate types of plug-in unit, the foregoing description and basic reference characters will suffice for the several types of units hereinafter described, as for example in the intermediate type of unit depicted in Fig. 5.

The construction of the terminal unit 27 (shown in Fig. 4) is completed by the provision of a pair of small lamp-connecting plugs 38 seated in slots moulded into the shell 27B for plug-in connection with spring receptacle contacts 39, similarly seated in recesses in the central unit shell 30B. Conductors 38A connect the socket 32 with said contact plugs 38.

It will thus appear that the several inserted components, such as the socket 32, holding prongs 33, contact plugs 38, etc., being seated in suitable seating formations molded into the plastic shell pieces, are securely locked in position by application of the companion shell pieces (as for example in Fig. 9), particular attention being drawn to the annular groove 33C in the holding prong, in which integrally molded projections 27X of the shell pieces engage, so that the prongs are free to rotate, but are secured against axial movement. The shell sections are held together by screws 27C.

Additional stabilizing plug-in support, over that afforded by the relatively sturdy prongs 33, is effected by providing interfitting or nesting body formations on the meeting ends of the several plug-in housings; for example, the meeting end of the unit 27 is provided with a shallow end socket at 27D, whereas the complementary meeting end of the central housing shell is provided with a complementary protuberance 30D adapted to nest therein with such snug fit that the meeting juncture at line 29 is very close, and lends somewhat the appearance of an integral structure to the assembled units.

The unit 27 of Figs. 4 and 9 is termed for convenience a "terminal" unit, because its outer free end 27E (at the left) is closed and has no prongs or plugs for juncture with added units; whereas other sections conveniently termed "intermediate" and "angular" lamp units are disclosed which do have such provisions, and are in effect double-ended.

An intermediate unit 40 is shown in Fig. 5 in the same sectionalized plan of view as the single-ended unit 27 of Fig. 4; and it will be observed that the construction and arrangement of the holding and contact prongs 33X, 38X, the cam release means 33A—34X, and the socket 32X, are substantially identical to the analogous parts in Fig. 4, one minor exception being that the socket 32X is placed about in the middle of the housing, instead of near the end.

The only important difference between the terminal unit of Fig. 4 and the intermediate unit of Fig. 5 is the fact that the latter is double-ended and has receptacle means at its free or left-hand end, including prong-holding spring clips 36X and power contacts 39X, so that another unit, for example the unit 27 of Figs. 2 or 4, may be plugged into assembly therewith. Obviously, by use of several of the double-ended or intermediate types of unit the light bar can be extended in length, horizontally, as much as desired. In practice, it is usually found adequate, where a considerable amount of light is needed, if two intermediate and two terminal units are placed on opposite sides of the central control unit 30.

The camera head or mount 21, as viewed in Figs. 9 and 10, consists of a metal stamping of inverted channel shape having a top face 21A upon which is secured (as by adhesive) a ribbed rubber mat 21B. Through a cross slot 21C projects the threaded end 21D of a camera-engaging screw, the knurled head 21E of which is disposed interiorly the channel plate.

Means for locating the camera on the table or head for quick engagement with the screw part 21D includes a yieldable guide wire 21F projecting through a slot at one side of the channel face 21A and having offset legs engaged in punched ears 21G on the inside of the channel plate.

Mounting wings 21H, having open-ended slots 21J, are offset from the opposite sidewalls of the channel plate for engagement with hold-down levers 21K carried on through-bolts 21L (Fig. 9) passing through both shell pieces.

By turning both levers 21K parallel to the slots in the wings 21H (as at the right of Fig. 10) the head plate may be quickly removed; but when these hold-down levers are turned crosswise of the slots 21J the plate is locked home, embossments 21M being provided on the wings to jam the hold-down levers.

If it is desired to mount the camera on the central carrying or control unit 30, the levers 21K are turned open and the head plate is removed and engaged with the camera by turning-in the screw 21E, whereupon the channel plate with camera attached is locked back in position on the crown of the central unit by turning back the hold-down levers, as aforesaid.

A flat blade-spring 21N is riveted to the underside of the channel to urge the wire guide 21F upwardly (see Fig. 6), while permitting the wire to yield in case a camera with over-size base is to be seated.

The pistol grip 23 consists of two mating shell sections of molded plastic meeting along a line 23A (Figs. 2 and 3), and secured together by means of cross-wise through-bolts 23B (Figs. 1 and 6).

The upper end of the grip 23 fits up into the underside of the bottom shell 30B (Figs. 6 and 8) and is secured thereto by means of a long tie bolt 23C having its head 23D (Fig. 6) engaged with a switch base plate 42 before passing down through the lower central shell piece to thread, at its lower end, into an insert stud 23E at the bottom of the grip. The threaded bore of the stud is long enough to admit the mounting screw of a camera tripod or the like (not shown).

As viewed in Figs. 6 and 9, the trigger 24 rocks on a pin 24A seated in suitable aligned recesses molded into the mating pistol-grip shells. The locking button 25 is held for vertical reciprocation (Fig. 6) by sliding interfit with aligned grooving in the mating shell pieces, in which a lower tail portion 25A of the button slides, while an upper blocking extension 25B of this button projects slidably up into the central shell housing for blocking engagement with certain switch-operating mechanism to be described, when it is desired to hold the trigger in operated condition.

The trigger-operated switch mechanism (as viewed in Fig. 4) includes the aforesaid base plate 42, of irregular shape, which is positioned on the floor parts of the lower central shell piece 30B by some of the several through-bolts which traverse this shell assembly, such as the locking lever bolts 21L and other bolts 21W.

Positioned on top of the base plate 42 is a slide plate 43 (Figs. 4, 6, and 9) having a down-turned guide tab 44 (Figs. 4 and 6) working in a slot 45 in the base plate, with a down-turned lug 45 at the right (as in Fig. 6) to be engaged by the upper end 24B of the trigger, so that when the latter is depressed (to pivot clockwise) the slide plate will shift toward the right, as seen in Fig. 6, or toward the observer in Fig. 9, a pair of coil springs 46 being attached to ears at opposite ends of the two plates 42 and 43 to draw the slide plate normally to the left in Fig. 6, thus also pivoting the trigger to a normal position, as there shown. The slide plate has an elongated central slot to clear the head 23D of the long tie bolt, as will be apparent in Figs. 4 and 6.

Struck up from the slide plate 43 is a switch-operating lug 47 (Figs. 4 and 9) which is adapted to bear against an insulating strip 48 (Fig. 9), which is slotted to fit over a plurality of spring blades generally indicated at 49 and forming part of a conventional stack switch 50 secured by bolts 51 to a pair of angles 52 carried on the floor of the lower shell casting.

It will thus appear that by depressing the trigger the slide plate 43 is shifted against the tension of coil springs 46 (toward the bottom of the sheet in Fig. 4, or toward the observer in Fig. 9) causing lug 47 to bear against the insulating bar 48, thereby flexing all of the switch blades 49 from the normal condition shown in Fig. 4, with resulting circuit changes to be described hereafter.

Master switch means to condition the lamp circuit for operation when the device is connected to a suitable commercial power outlet includes a stationary contact 54 (Fig. 4) and a movable spring-blade contact 55, both assembled as part of the stack switch 50, and normally biased to open-circuit condition. A plastic operating wheel 56 is pivoted by a pin 57, seating in aligned recesses molded into the upper and lower shell sections 30A, 30B, so that the wheel projects in part exteriorly of the shell housing (as in Figs. 1, 4, 7, and 9); and this operating wheel has an inner cam formation 56A adapted to engage the movable master switch contact blade means 55 so that when the wheel is turned slightly from its normal "off" position shown in Fig. 4, it will flex the contact blade 55 into circuit-closing engagement with its companion contact 54 to close the main power circuit and cause reduced or stand-by illumination of the lamps (by connecting some of them in series) according to circuit connections hereinafter to be described.

The plug-in connection for a power cord includes a pair of prongs 65 (Fig. 4) seated in molded recesses in the lower central housing shell and projecting into a plug-receiving recess 66, also formed in the shells, and shown to further advantage in Fig. 8. A standard female plug on a conventional extension cord is to be plugged into the recess 66 to connect power from a 110 v. line to contact prongs 65.

It will be apparent that the lamp interconnecting contacts 39, as well as the spring locking clips 36 for the holding prongs, which appear on the left side of the central unit in Fig. 4, are duplicated on the right-hand side at 36' and 39'.

The trigger-switch mechanism is also adapted to control a camera by means of a conventional shutter-release cable 60 attached as shown in Figs. 1 and 2, a threaded coupling collar 61 (Fig. 2) being provided to engage a bushing on the front of the central handle unit 30 for the plunger end of the cable.

The cable coupling (as seen in Fig. 6) consists of a threaded bushing 62 seated in the front wall of the lower shell section 30B in alignment with the lug 45 on the front of the slidable switch plate. To install the cable, one end is threaded into the standard camera cable-release bushing (not seen in detail) in the usual manner, and the plunger end of the cable (which is commonly intended to be operated by hand) is inserted into the bushing after first passing the outer threaded retaining ring means 61 over the small end of the cable, and turning the ring home on the bushing 62, as in Fig. 6; this holds the plunger head 60A so that the plunger button 60B is in position to be engaged and pushed by the lug 45 on the switch plate when the trigger is depressed, thereby operating the conventional shutter-release means (not seen) of the camera in the manner well understood in the art.

For side lighting effects, an angular unit 70, such as shown in Figs. 11 and 12, is used in conjunction with one or more of the terminal units 27 or intermediate units 40.

The construction of the angular unit 70, according to Fig. 12, is identical to that of the units 27 or 40 so far as the holding prongs 33Y and lamp-connector plugs 38Y are concerned, there being likewise release buttons 35AY and 35BY (Fig. 11) for rotating the holding prongs in the same manner as effected by buttons 35A and 35B on the unit 27.

However, the angular type of unit has a T-head 71 with two oppositely-facing (double-ended) plug-in assemblies for engagement with additional lamp units, one of which assemblies is indicated at 72 in Fig. 11, and another at 73, the latter being engaged by the unit 27. This T-head construction is especially shown in Fig. 13, wherein it is seen that a double set of connector contacts 39Y, connected in parallel by wires 74, is provided along with a double set of the spring clips 36Y, each of said sets opening into one of the ends 72 or 73 of the T-head.

The shell structure for this angular unit consists of a pair of mating shell members 70A and 70B (Fig. 11) and an end cap 70C secured in place by bolts 70D, threading into the companion shell pieces (as in Figs. 12 and 13).

The control circuit is shown in Fig. 14, wherein the line-cord contact plugs 65 are adapted to be connected to the usual 110 v. power outlet by means of a conventional cord and plug set 67.

By turning the master switch wheel 56 to the "on" position, contacts 54 and 55 will be cammed closed, thereby connecting power from one of the power terminal plugs 65A via conductor 80 to the master switch blade 55, thence to its companion contact 54 and conductor 81 to one of the lamp connector terminals 39', thence through the filament of a lamp 22' (assuming a lamp unit to be plugged into both sides of the central unit) and thence via the remaining lamp connector terminal of the pair 39' and conductor 82 to trigger switch blade 49E, normally closed with blade 49F, which is looped by conductor 83 to contact blade 49B, normally engaged with contact blade 49A, thence via conductor 84 to one of the lamp connector terminals of the left-hand pair 39, thence through the filament of the lamp 22 (assumed to be plugged in at the left side of the central unit) and back through the remaining connector terminal of the pair 39 via conductor 85 to the remaining power plug terminal 65B.

It will thus be seen that this normal stand-by circuit, upon closure of the master switch means 54, 55, 56, and the normal condition of the contacts of trigger switch 50, connects the two sets of lamp connector terminals 39, 39' in series, and hence any lamps 22, 22' plugged into these terminals 39, 39' will be connected in series and will therefore burn at reduced brilliance, as will any additional lamps (for instance lamps $22^2$, $22^3$, $22^4$) carried in other plug-in units included in the assembly, since the lamps of all additional units will be connected in parallel with the two series-connected lamps 22, 22'.

Referring still to Fig. 14, when the trigger 24 is depressed, the switch 50 will be operated to the off-normal condition with the result that the normal stand-by series circuit for lamps 22 and 22' will be changed to a parallel circuit by reason of the fact that now contact 49A will disengage normal contact 49B and engage its off-normal contact 49C, thus connecting one side of the power line (from contact 54) directly via conductor 84 to one of the lamp plug terminals 39, while contact 49E will likewise disengage its normal contact 49F and engage its off-normal contact 49D, thereby connecting the remaining side of the power line (from conductor 85) directly to one of the lamp connector terminals of pair 39'.

Thus the trigger operation of the switch means 50 converts the normal series stand-by circuit to an off-normal parallel circuit so that all of the lamps are now in parallel with the power line connection and will promptly come up to full brilliance, since the respective filaments thereof have been hot while in the aforesaid stand-by condition.

I claim:

1. A photographic light bar comprising a plurality of elongated lamp units, and a central unit having a pendant handle grip; plug-in means on two opposite sides of said central unit; complementary plug-in means on at least one axial end of each lamp unit and adapted for plug-in joinder with the plug-in means on the central unit, whereby said lamp units may be removably joined with the central unit to extend in linear alignment with each other; a lamp socket on a side of each said lamp unit; a power feed circuit in said central unit and connected with said plug-in means thereof; the lamp socket of each lamp unit being electrically connected with said plug-in means thereof for connection with said feed circuit of the central unit when said complementary plug-in means of the lamp units is joined with the plug-in means of the central unit; and switch means on the central unit for controlling power connections between said feed circuit and said plug-in means thereof to dim lamps in said lamp units by connecting the same in series, and to connect the same in parallel responsive to operation of said switch means.

2. In a light bar assembly, a central unit having a pendant handle grip and a plurality of sets of plug-in power terminals on opposite sides of said central unit above said handle grip; and elongated, plug-in lamp units each adapted to be plugged into one of said opposite sides and each including a lamp socket connected to a set of plug-in lamp terminals complementary to any said set of lamp terminals on the central unit; and complementary sets of plug-in holding prongs and prong receptacles on the central unit and on each lamp unit and each respectively associated in close proximity with one of said sets of plug-in terminals on the appertaining control and lamp units, such that plugging-in of any set of lamp-unit holding prongs with any set of complementary prong receptacles on the central unit occurs with concurrent engagement of the appertaining complementary sets of lamp terminals, whereby the plugging-in of a lamp unit with the central unit, as aforesaid, establishes a power connection between the lamp socket of a lamp unit and the lamp terminals of the central unit; a power circuit in said central unit adapted for connection to a power outlet; a manually operable cut-out switch on said central unit and connected in said power circuit to open and close the same; a manually operable change-over switch connecting said circuit with said lamp terminals of the central unit for series or parallel operation from said power source; and an operating member for said change-over switch and located on a side of said handle grip which is closer to the top than the bottom of the latter.

3. A sectionalized light bar structure for photographic use comprising: a central member having a handle, a lamp power circuit and means for connecting the latter with a power line; at least two elongated lamp extensions each including a lamp socket and power terminal means therefor; said central member having complementary power terminal means on opposite sides thereof and respectively cooperable with the power terminal means on the lamp extensions for interconnecting the power terminals of the attached lamp extensions with said power circuit; and cooperating plug-in prong means on the several lamp extensions and on said opposite sides of the central member for removably securing any said lamp extension in plug-in joinder with said central member; together with manually controlled switch means on the central member and connected with said terminal means for controlling connections between said power terminals and said power circuit thereof to dim lamps in said extensions.

4. In a photographer's light bar structure, a plug-in assembly comprising a central unit including a power-distributing circuit; a handle grip on said unit; plug-in means including power terminals aligned with each other on opposite sides of said unit with said power-terminals connecting said distributing circuit thereof; at least two elongated lamp units each having plug-in means including power terminals and located at one axial end thereof, at least; each lamp unit further having a lamp socket located on a side thereof between its axial ends, said sockets being respectively connected in circuit with the appertaining power terminals for energization through the latter; the plug-in means, including the power terminals thereof, for the lamp units being complementary to the plug-in means on said central unit for plug-in joinder of one lamp unit with the central unit on each of said opposite sides thereof, whereby said lamp units extend in linear alignment with each other from opposite sides of the central unit; means on the central unit for connecting said distributing circuit to a power source; means on the central unit for removably attaching a camera thereto; a coupling on the central unit for engagement with the plunger of a camera-operating cable; switch means on the central unit including a movable part situated to cooperate with, and actuate said movable part of the switch means for concurrent operation of the switch means and camera-operating cable plunger; manually actuated means for moving said movable part of the switch means, the latter being connected in said distributing circuit for operation to change connection of power to said power terminals from a normal series connection of said lamp sockets to a parallel connection thereof.

5. A sectionalized photographer's light bar comprising a central handle unit and a plurality of elongated plug-in lamp units each removably plugged into the central unit with at least one lamp unit extending from each of two opposite sides of the central unit and in linear alignment with each other; at least one holding prong at an axial end of each lamp unit, said holding prongs each having a holding formation thereon; complementary holding-prong gripping means on said opposite sides of the central unit for holding said lamp units in plugged-in joinder with the central unit as aforesaid; a lamp socket on each lamp unit; complementary power-contact means on each lamp unit and said opposite sides of the central unit, and respectively located adjacent the appertaining holding-prong and gripping means of said units, whereby said complementary contact means of the respective lamp units and central unit are operatively engaged by plug-in joinder of a lamp unit with the central unit, as aforesaid, said lamp sockets being respectively connected to the appertaining power contact means; said holding prongs being rotatively mounted in their respective lamp units and each spring-urged into a normal rotative plug-in holding position; said complementary gripping means having gripping parts oriented to seize the holding formation of any of said prongs in the normal position of the latter and grip the same securely; rotative movement of any holding prong from normal position turning the same to a release position to free the holding formation thereof from seizure of said gripping means; button means on each lamp unit operable to rotate the appertaining holding prong from normal to release position; a power feed circuit in the central unit connected to said power contact means thereof; and switch means on the central unit connected to control flow of power from said feed circuit to said contact means on the central unit.

6. In a photographic light bar assembly, a lamp unit including a lamp socket, said unit being adapted for plug-in joinder to a companion unit; plug-in means comprising a pair of rotatable holding prongs extending in parallelism from said lamp unit; each prong having a free end portion including a locking formation oriented rotatively with respect to a predetermined normal rotative position of the prong in the lamp unit; spring means for turning said prongs to said normal position; push-button means on said lamp unit for rotatively turning said prongs out of said normal position to a predetermined release position; and complementary holding means for said prongs on said companion unit and including parts respectively oriented angularly to receive and securely hold said free end portions and the respective locking formation thereof on the prongs in said normal position of the latter; said prongs being turned as aforesaid by operation of said push-button means to said release position relative to the complementary holding means on the companion unit, when joined with the latter, so that the lamp unit may be freely disjoined from the companion unit.

7. In a photographic light bar, a handle unit having plug-in receptacle means on opposite sides thereof and connecting means for a power source to energize said receptacle means; and an angle unit including a first plug-in means engageable in said receptacle means for mounting said angle unit on said handle unit and connecting the same with power from said connecting means; said angle unit further including additional plug-in receptacle means facing in opposite directions along a line which is at right angles to said first plug-in means thereon; together with lamp socket means having plug-in means cooperable with said additional receptacle means on the angle unit and also with the receptacle means on the handle unit whereby a lamp in the socket unit will be energized from said connecting means whether the lamp socket unit is plugged into said angle unit or into said first receptacle means on the handle unit.

8. A knock-down photographic light bar set comprising a handle unit having a handle grip with power feed circuit means therein and plug-in connection means on opposite sides thereof connecting with said circuit means, and means for removably securing a camera thereon in position above said handle grip; together with a plurality of lamp units each having opposite end portions with a lamp socket on a side thereof between said end portions, and electro-conductive plug-in connection and mounting means at each said end portions the plug-in means at one said end portion being in the form of elongated prong means and that at the opposite end portion being in the form of circuit means for receiving a light prong means on a lamp unit joined thereto, whereby a plurality of said lamp units may be electrically and mechanically joined in alignment to define a bar and each said bar may be joined to one of said opposite sides of the handle unit by the plug-in means at one of the ends of said bar with said joined bars in predetermined alignment with each other; the plug-in means in each lamp unit being electrically connected to the appertaining socket and serving in joined relation as aforesaid with other plug-in means to extend a power feed connection to all sockets comprised in the appertaining bar; and switch means on said handle unit connected to control power from said feed circuit to the plug-in connection means on the opposite sides of the handle unit as aforesaid.

9. A light bar set according to claim 8 further characterized in that certain of said lamp units have said end portions and plug-in means thereat located in angular relation whereby a conjoined lamp socket will be located out of alignment and in angular relation to the handle unit for procuring said lighting effects.

References Cited in the file of this patent

UNITED STATES PATENTS

| | | |
|---|---|---|
| 1,333,182 | Minor et al. | Mar. 9, 1920 |
| 1,985,097 | Kearsley | Dec. 18, 1934 |
| 2,218,545 | Morten | Oct. 22, 1940 |
| 2,261,953 | Brown | Nov. 11, 1941 |
| 2,481,181 | Walter | Sept. 6, 1949 |
| 2,486,727 | Anderson | Nov. 1, 1949 |
| 2,494,428 | Buck | Jan. 10, 1950 |
| 2,532,075 | Powell | Nov. 28, 1950 |
| 2,535,372 | Schaeffer et al. | Dec. 26, 1950 |
| 2,682,816 | Walden | July 4, 1954 |

FOREIGN PATENTS

| | | |
|---|---|---|
| 604,825 | Germany | Oct. 29, 1934 |
| 900,246 | France | Sept. 25, 1944 |